May 28, 1968   J. O. CASALE   3,385,075
METHOD AND APPARATUS FOR FREEZING FOODS
Filed Aug. 25, 1965   2 Sheets-Sheet 1
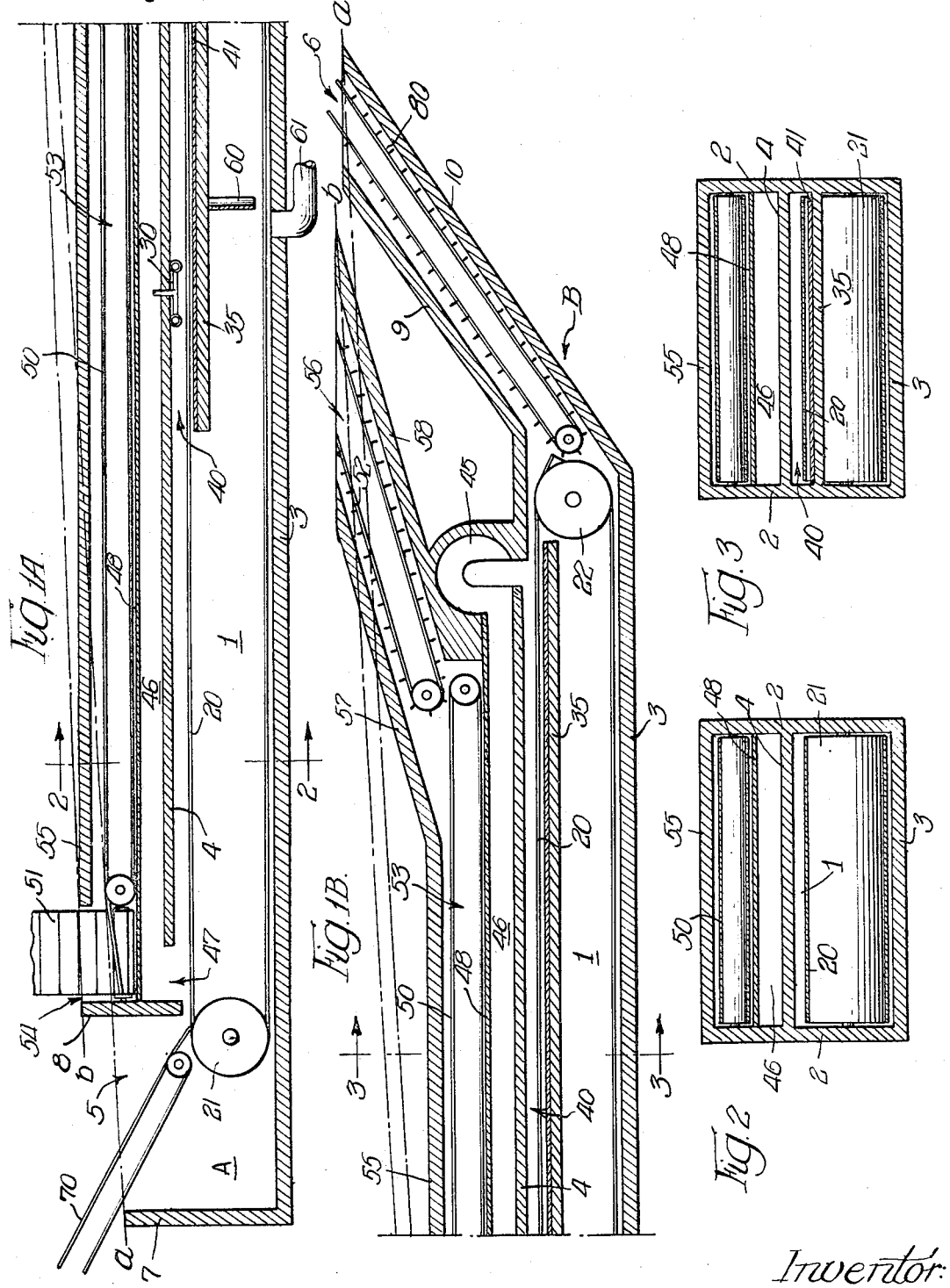
Inventor:
Jorge O. Casale,
Hume, Groen, Clement + Hume
attys

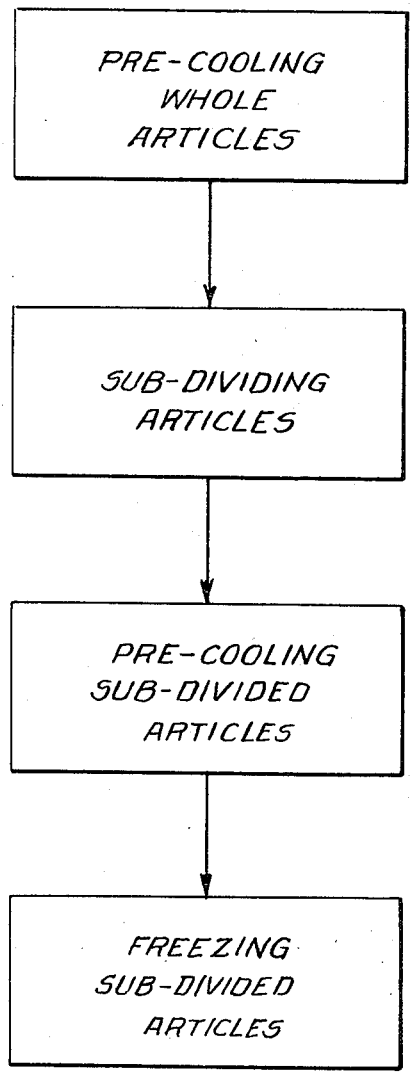

United States Patent Office 3,385,075
Patented May 28, 1968

3,385,075
METHOD AND APPARATUS FOR FREEZING FOODS
Jorge O. Casale, Chicago, Ill., assignor to Libby McNeill & Libby, Chicago, Ill., a corporation of Maine
Filed Aug. 25, 1965, Ser. No. 482,483
5 Claims. (Cl. 62—63)

This invention generally relates to the cryogenic freezing of foods, and more particularly relates to an improved method and apparatus for the quick-freezing of tomatoes.

Many methods of freezing foods by the direct contact with or immersion in volatile cryogenics, such as liquid nitrogen or the like, are generally well known to the prior art. The physical characteristics of tomatoes makes unsuitable the prior processes and apparatus for the quick-freezing of tomatoes in a continuous process, because the tomatoes are frozen too slowly to prevent premature freezing. Such premature freezing results in the formation of undesirably large ice crystals, rupture of the tomato cell structure, and cracking of the skin, thus greatly degrading the appearance and marketability of the tomato.

Prior art processes and apparatus for freezing foods including tomatoes are also unsuitable and uneconomical due to the lack of provision for complete utilization of the complete cooling capacity of the volatile cryogenic in a manner which prevents premature freezing. Prior freezing devices are also disadvantageous in that they cannot be readily adapted to the simultaneous pre-cooling of a separate group of whole unsliced tomatoes as an adjunct to the freezing of the tomatoes. The need for an improved process and apparatus which promotes the freezing of tomatoes, preventing premature freezing of the tomato, is thus readily apparent.

For the above reasons there has been no commercial marketing of frozen tomatoes heretofore, although other frozen vegetables have been available for years.

Accordingly, it is the principal object of this invention to provide a method and apparatus for the freezing of foods, and specifically tomatoes, so as to retain their natural appearance.

It is a further object of the invention to provide an improved method and apparatus for the quick freezing of tomatoes in a continuous operation which prevents the premature freezing.

It is a yet further object of this invention to provide an improved multi-stage process for freezing tomatoes wherein the tomatoes are frozen by first pre-cooling the tomatoes, and then subjecting the tomatoes to both the latent and sensible heat of a spray of a volatile cryogenic within a confined volume to substantially reduce the temperature of the tomatoes and complete the freezing operation.

It is a still further object of this invention to provide an improved apparatus for freezing tomatoes which eliminates premature freezing.

Another object of this invention is to provide an apparatus for freezing tomatoes in which the efficiency and effectiveness of the coolant is increased by subjecting the tomatoes to both the latent and sensible heat of a volatile cryogenic spray in a channel of limited depth and confined volume.

In addition, it is an object of this invention to provide an improved process and apparatus for freezing tomatoes wherein a separate group of whole unsliced tomatoes may be simultaneously pre-cooled.

The method for freezing foods in accordance with the invention will be generally described specifically in connection with tomatoes. Generally described, this method comprises conveying the tomatoes through a substantially air tight freezing tunnel, pre-cooling the tomatoes within the tunnel by exposure to a cool but not cold gaseous atmosphere, spraying the tomatoes in the tunnel directly with a volatile liquid cryogenic to substantially reduce the temperature of the tomatoes, and subjecting the tomatoes within the tunnel to the cold gaseous coolant evolved from said cryogenic spray to complete the freezing and promote temperature equilization of the tomatoes.

In addition, the apparatus for freezing tomatoes in accordance with this invention may be generally described as comprising enclosure means defining the outer confines of an elongate freezing tunnel having a feeding end and a discharge end, said enclosure means including an inlet opening through which the tomatoes may enter the feeding end of the tunnel at the beginning of the freezing operation and further including an outlet opening through which the tomatoes may exit from the discharge end of the tunnel at the completion of the freezing operation, sealing means to prevent the entrance of ambient atmosphere into the tunnel through said inlet and outlet openings during the freezing operation, said freezing apparatus further including an elongate freezing channel of limited depth positioned longitudinally within said tunnel and in communication therewith adjacent the discharge end of said tunnel, conveying means disposed within said tunnel to convey the tomatoes through said tunnel and said freezing channel during the freezing operation, means to pre-cool the tomatoes, means positioned within said freezing channel to spray the tomatoes directly with a volatile cryogenic coolant as the tomatoes are conveyed therethrough to substantially reduce the temperature of the tomatoes, means to conduct the cold gaseous coolant evolved from said coolant spray through said freezing channel toward the discharge end of said tunnel to expose the tomatoes to said cold gaseous coolant as they are conveyed through said channel to complete the freezing of the tomatoes and equalize their temperature, whereby said gaseous coolant is warmed by absorbing the sensible heat from the tomatoes, and means to exhaust said warm gaseous coolant from said tunnel.

More specific objects and features of this invention will be apparent from a description of an embodiment of the apparatus, as illustrated in the drawings. In these drawings:

FIGURE 1A is an elevational view in section of the feeding end of the freezing apparatus of this invention;

FIGURE 1B is an elevational view in section of the discharge end of the freezing apparatus, and in conjunction with FIGURE 1A illustrates a complete elevational view of this embodiment of the apparatus;

FIGURE 2 is a cross-sectional view taken along the line 2—2 in FIGURE 1A;

FIGURE 3 is a cross-sectional view taken along the line 3—3 in FIGURE 1B; and

FIGURE 4 is a flow diagram illustrating the process of the present invention.

As seen from these drawings, the freezing apparatus in accordance with this invention includes an elongate freezing tunnel 1 having a feeding end A and a discharge end B. This tunnel 1 is enclosed by the side walls 2, a bottom wall 3, and a ceiling 4, as best seen in FIGURES 2 and 3. This enclosure defining the tunnel 1 also includes an inlet opening 5 through which the tomatoes may enter the feeding end of the tunnel in the beginning of the feeding operation, and an outlet opening 6 through which the tomatoes may exit from the discharge end of the tunnel at the completion of the freezing operation. As described in more detail hereinafter, the discharge end B of tunnel 1 is positioned lower than the feeding end A to induce the flow of any excess cryogenic toward the discharge end B of the tunnel.

In the accordance with the preferred embodiment of this invention, the inlet opening 5 is defined by vertical end walls 7 and 8 at the feeding end A of the tunnel, and the outlet opening 6 is defined by inclined walls 9 and 10 at the discharge end B of the tunnel. Moreover, the tunnel 1 is positioned so that the openings 5 and 6 are in substantial alignment, as indicated by the line a—a in FIGURES 1A and 1B. By this arrangement, the cold gaseous coolant within the tunnel, being more dense than the ambient air, is confined by gravity between the vertical end walls 7 and 8 at the inlet opening 5 and between the inclined walls 9 and 10 at the outlet opening 6. The gaseous coolant within the tunnel is thus held below the level a—a, and forms gas pools or gas-locks which effectively seal the openings 5 and 6 and prevent the entrance of ambient atmosphere into the confines of tunnel 1 during the freezing operation.

The freezing apparatus also includes an endless conveyor 20 disposed within the tunnel 1 to carry the tomatoes through the tunnel during the freezing operation. This conveyor 20 is supported by suitable sprockets 21 and 22, and can be driven at the desired speed by any suitable power source, not shown.

In addition, the tunnel 1 includes a coolant spray head 30 positioned near the central portion of the tunnel above the endless conveyor 20, as best seen in FIGURE 1A. This spray head 30 is preferably of sufficient size to spray the volatile cryogenic coolant, such as liquid nitrogen, across the entire width of the conveyor 20 and the tunnel 1 so that complete exposure of the tomatoes to the coolant is assured.

It is also a feature of this invention to maximize the freezing effect of the cryogenic coolant spray, and of the gaseous coolant evolved from the coolant spray, by spraying the coolant onto the tomatoes in a channel which is more limited in depth and of smaller volume than the freezing tunnel generally. Such provision allows substantially of the coolant sprayed onto the tomatoes to be vaporized, and increases the exposure of the tomatoes to the cold gaseous coolant thereby evolved, as will be more fully described hereinafter.

Tunnel 1 is thus further provided with an elongate partition 35 which is disposed transversely across the discharge end B of the tunnel and which extends longitudinally within the tunnel a substantial distance toward the feeding end A, as illustrated in FIGURES 1A and 1B. In addition, the partition 35 is positioned below the spray head 30 and the endless conveyor 20, and thus defines an elongate channel 40 of limited depth with respect to the depth of the tunnel through which the tomatoes are conveyed during the freezing operation. As shown in FIGURE 1A, it is preferred that the partition 35 in fact be extended a substantial distance beyond the spray head 30 toward the feeding end A of the tunnel 1, Such extension of the partition 35 increases the freezing effect of the spraying operation by containing the cryogenic coolant and the evolved gases within the freezing channel 40. Due to the inclination of the tunnel 1, any excess cryogenic resulting from the syraying operation will be induced to flow along partition 35 toward the lower discharge end B of the tunnel. The top of partition 35 may also be provided with a stainless steel sheet 41, or the like, to protect the partition from the eroding effects of the cryogenic.

After the tomatoes are sprayed with the volatile cryogenic from the spray head 30, the temperature of the tomatoes is equalized, and complete freezing of the tomatoes assured, by exposing the tomatoes directly to the confined volume of cold gaseous coolant evolved within the channel 40 from the vaporization of the coolant spray. The freezing apparatus is therefore provided with suitable means to conduct this cold gaseous coolant outwardly within the channel 40 toward the discharge end of the tunnel 1 so that the cold gas will flow into contact with the tomatoes being conveyed in the channel 40. This conduction of the cold gaseous coolant in this embodiment is induced by connecting a suitable blower fan 45 with the channel 40 to reduce the pressure at the discharge end B of the channel, as seen in FIGURE 1B.

It is apparent that the exposure of the gaseous coolant to the tomatoes within the channel 40 will raise the temperature of the gas which will exhaust from the freezing channel. This warmer exhausting gas is thus suitable for pre-cooling unfrozen tomatoes, to reduce their temperature, before the tomatoes are subjected to the cryogenic spray. Accordingly, the freezing apparatus also includes a conduit 46 to conduct this warm gaseous coolant exhausting from the channel 40 to the feeding end of tunnel 1 for exposure to the unfrozen tomatoes being conveyed in the tunnel toward the spray head 30.

As shown in FIGURES 1A and 1B, conduit 46 is connected to the output side of the blower fan 45, and is in communication with the feeding end of the tunnel 1 through the orifice 47. The conduit 46 may be formed by connecting a plate 48 to extensions of the tunnel side walls 2. The tunnel ceiling 4, which is preferably insulated, thus forms the bottom portion of the conduit 46, as seen in FIGURES 2 and 3. The tunnel 1 is also provided with a baffle plate 60 which limits the recirculation of the gaseous coolant used to pre-cool the tomatoes, and an exhaust port 61 through which the spent gaseous coolant may leave the tunnel 1 for recirculation, if desired.

In the preferred embodiment of this invention, this conduit 46 is provided with heating means to further increase the temperature of the warmer gaseous coolant flowing therethrough, and assure that the cool but not cold gas used for pre-cooling the tomatoes is sufficiently warm to prevent premature freezing. Although other suitable means may be use to heat the gas flowing through conduit 46, this apparatus is readily adapted to use the excess refrigerating capacity of the gaseous coolant to reduce the temperature of whole unsliced tomatoes being conveyed to a separate slicing operation, so that the whole tomatoes are firmed up before being sliced. By such an arrangement, the freezing apparatus of this invention will simultaneously cool and firm up a group of whole unsliced tomatoes in preparation for slicing, and warm the gaseous to be used in pre-cooling the tomatoes during the freezing of another group of tomatoes.

To bring the tomatoes to be sliced into heat exchange relationship with the conduit 46, the plate 48 forming the top of the conduit is made of a suitable heat conducting material, such as thin metal, and suitable conveying means are provided to carry the whole tomatoes into the proper position above the plate 48. As shown in FIGURES 1A and 1B, the conveying means in this embodiment comprises the conveyor 50 mounted parallel to the plate 48 within a tunnel 53. As also shown in FIGURES 1A and 1B, the feeding opening 54 of the tunnel 53 is formed between the leading edge of ceiling plate 55 and the vertical end wall 8, and the discharge opening 56 of tunnel 53 is formed between the inclined end walls 57 and 58. In addition, the conveyor 50 is in conveying relationship with a feeding conveyor 51, extending through opening 54 and discharge conveyor 52, extending through discharge opening 56. To improve the efficiency of this heat exchange, the tunnel 53 is made air-tight by positioning the feeding opening 54 and the discharge opening 56 in substantial alignment, as indicated by the line b—b in FIGURES 1A and 1B. These openings 54 and 56 are thereby effectively sealed from the ambient atmosphere by the dense cold air retained within the openings by the force of gravity.

The freezing apparatus as above described therefore provides a freezing tunnel which will freeze tomatoes by exposing the tomatoes to a series of operations which reduces their temperature and prevents premature freezing. Moreover, it is apparent from the above description that the freezing apparatus of this invention may be readily adapted to simultaneously firm up whole tomatoes in preparation for slicing without decreasing the efficiency of the tomato freezing operation.

In the operation of this freezing apparatus, the tomatoes to be frozen are fed through the inlet opening 5 of the tunnel, through the gas-lock, by a suitable device such as the conveyor 70. Conveyor 20 then carries the tomatoes through the initial portion of tunnel 1 where the temperature of the tomatoes is reduced by exposure to the warm gaseous coolant exhausted from the freezing channel 40, as described above. To continue the freezing operation, the tomatoes are then carried into the freezing channel 40, and their temperature further reduced by subjecting the tomatoes to a spray of a volatile cryogenic coolant, such as liqud nitrogen, which is continuously discharging from the spray head 30. The sprayed tomatoes are then exposed within freezing channel 40 to the cold gaseous coolant formed by the vaporization of the coolant spray. After the freezing of the tomatoes is completed and their temperature equalized by this exposure to the cold gaseous coolant, the tomatoes may then be discharged through the outlet opening 6 of the tunnel, and carried to storage or to further processing stations, by means such as conveyor 80.

The evolved gaseous coolant is conducted toward the discharge end B of the tunnel by the blower fan 45, and is thereby exhausted from the freezing channel 40 into the conduit 46. The blower fan 45 then conducts this exhaust gas to the feeding end A of the tunnel 1 to pre-cool the tomatoes positioned therein. This gas then exits from the tunnel 1 through the port 61, and may be treated for recirculation.

As this gas flows through conduit 46 in this illustrated embodiment, the gas absorbs heat from the tunnel 53 by conduction through the plate 48 and thereby reduces the temperature of the air within tunnel 53. The temperature of the separate group of whole unsliced tomatoes, which are simultaneously being conveyed through the tunnel 53, is thereby reduced by exposure to this cool air and the tomatoes therein are firmed up and in condition to be sliced by any suitable apparatus, as by a device such as illustrated, for example, in Hoffman Patent No. 2,453,130.

The improved freezing apparatus and process of this invention can of course be applied to freeze food stuffs such as whole or part tomatoes, tomato wedges, or tomato slices with equal efficiency without departing from the scope of this invention. In addition, any suitable volatile coolant may be used.

As an example of the use of the apparatus and process of this invention to freeze tomato slices, slices of approximately one half inch thickness were fed into the freezing tunnel at room temperature. Exposure of the slices to the warm gaseous coolant within the tunnel pre-cooled the slices to approximately 40° F., slice center temperature. The pre-cooled slices were then conveyed into the freezing channel and directly sprayed with liquid nitrogen for over one minute, which lowered the temperature of the slices down to approximately 25° F. The cold nitrogen gas evolved by the vaporization of the liquid nitrogen was approximately −260° F. Subsequent exposure of the slices to this cold gaseous nitrogen further lowered the temperature of the slices so that they were discharged from the freezing tunnel at a temperature which ranged between −5° F. and 0° F. The slices were thus frozen, and premature freezing of the slices did not occur.

While the several embodiments of this apparatus and process described herein are at present considered to be preferred, it is understood that varous modifications and improvements may be made therein, and it is intended to cover in the appended claims all such modifications and improvements as fall within the true spirit and scope of the invention.

What is claimed is:

1. In a method of freezing tomatoes the steps which comprise:
   conveying whole tomatoes through a first tunnel,
   pre-cooling the whole tomatoes within the tunnel by exposure to cool gas,
   sub-dividing the tomatoes,
   conveying the sub-divided tomatoes through a second tunnel,
   pre-cooling the subdivided tomatoes in a second tunnel,
   spraying the sub-divided tomatoes in the second tunnel directly with a spray of a volatile cryogenic coolant to substantially reduce the temperature of the tomatoes and
   exposing the sub-divided tomatoes within the second tunnel to the cold gaseous coolant evolved from said cryogenic coolant spray to complete the freezing and promote temperature equalization of the tomatoes, and thereby utilize substantially the complete cooling capacity oft he volatile cryogenic coolant.

2. In the method of claim 1 in which said air in the first tunnel is cooled by passing in heat exchange relation to said second tunnel.

3. Apparatus for freezing tomatoes comprising enclosure means defining the outer confines of an elongate freezing tunnel having a feeding end and a discharge end, said enclosure means including an inlet opening through which the tomatoes may enter the feeding end of the tunnel at the beginning of the freezing operation and further including an outlet opening through whch the tomatoes may exit from the discharge end of the tunnel at the completion of the freezing operation, sealing means to prevent the entrance of ambient atmosphere into the tunnel through said inlet and outlet openings during the freezing operation, said freezing apparatus including a zone to pre-cool said tomatoes adjacent said feeding end and further including an elongate freezing channel of limited depth positioned longitudinally within said tunnel and in communication therewith adjacent the discharge end of said tunnel, conveying means disposed within said tunnel to convey the tomatoes through said tunnel and said freezing channel during the freezing operation, means positioned within said freezing channel to spray the tomatoes directly with a volatile cryogenic coolant as the tomatoes are conveyed therethrough to substantially reduce the temperature of the tomatoes, means to conduct the cold gaseous coolant evolved from said cryogenic coolant spray through said freezing channel toward the discharge end of said tunnel to expose the tomatoes to said cold gaseous coolant as they are conveyed through said channel to complete the freezing of the tomatoes and equalize their temperature whereby said gaseous coolant is warmed by absorbing the sensible heat from the tomatoes, said discharge end of said tunnel being positioned below the feeding end thereof to induce the flow of excess cryogenic coolant toward the discharge end of said tunnel, separate conduit means to conduct the warm gaseous coolant exhausting from said channel to said feeding end of said tunnel to expose the tomatoes to said warm gaseous coolant and pre-cool the tomatoes in advance of said means to spray the tomatoes, and means to exhaust said warm gaseous coolant from said tunnel.

4. Apparatus for freezing tomatoes comprising enclosure means defining the outer confines of an elongate freezing tunnel having a feeding end and a discharge end, said enclosure means including an inlet opening through which the tomatoes may enter the feeding end of the tunnel at the beginning of the freezing operation and further including an outlet opening through which the tomatoes may exit from the discharge end of the tunnel at the completion of the freezing operation, sealing means to prevent the entrance of ambient atmosphere into the tunnel through said inlet and outlet openings during the freezing operation, elongate partitioning means disposed across the discharge end of said tunnel and extending longitudinally within said tunnel a substantial distance toward said feeding end thereof to define an elongate freezing channel of limited depth within said tunnel, conveying means disposed within said tunnel and above said partitioning means to convey the tomatoes through said tunnel and said freezing channel during the freezing operation, spraying means positioned within said freezing channel above said partitioning means and said conveying means to spray the tomatoes directly with a volatile cryogenic coolant as the tomatoes are conveyed therethrough, means to conduct the cold gaseous coolant evolved from said cryogenic coolant spray through said freezing channel toward the discharge end of said tunnel to expose the tomatoes to said cold gaseous coolant as they are conveyed through said channel to complete the freezing of the tomatoes and equalize their temperature whereby said gaseous coolant is warmed by absorbing the sensible heat from the tomatoes, means comprising an external conduit positioned above said tunnel for conducting the warm gaseous coolant exhausting from said channel to said feeding end of said tunnel to expose the tomatoes to said warm gaseous coolant and pre-cool the tomatoes before the tomatoes are sprayed in said freezing channel, means to continuously convey whole unsliced tomatoes into heat exchange relationship with said warm gaseous coolant within said conduit whereby heat from the whole tomatoes is absorbed by said gaseous coolant, and means to exhaust said warm gaseous coolant from said tunnel.

5. Apparatus for freezing food such as vegetables, fruits, meat, fish and the like, comprising enclosure means defining the outer confines of an elongate freezing tunnel having a feeding end and a discharge end, said enclosure means including an inlet opening through which the food may enter the feeding end of the tunnel at the beginning of the freezing operation and further including an outlet opening through which the food may exit from the discharge end of the tunnel at the completion of the freezing operation, sealing means to prevent the entrance of ambient atmosphere into the tunnel through said inlet and outlet openings during the freezing operation, conveying means including an endless conveyor having upper and lower horizontal runs within said tunnel, elongate partitioning means including a metal plate disposed across the discharge end of said tunnel immediately below said upper run of said conveyor and extending longitudinally within said tunnel a substantial distance toward said feeding end thereof to define an elongate freezing channel of limited depth within said tunnel, said upper run of said conveyor serving to convey the food through said tunnel and said freezing channel during the freezing operation, spraying means positioned within said freezing channel above said partitioning means and said conveying means to spray the food directly with a volatile cryogenic coolant as the food is conveyed therethrough, means to conduct the cold gaseous coolant evolved from said cryogenic coolant spray through said freezing channel toward the discharge end of said tunnel to expose the food to said cold gaseous coolant as it is conveyed through said channel to complete the freezing of the food and equalize its temperature, separate conduit means to conduct the gaseous coolant exhausting from said channel to said feeding end of said tunnel to expose the food to said gaseous coolant and pre-cool the food before the food is sprayed in said freezing channel, and means to exhaust gaseous coolant from said tunnel.

References Cited

UNITED STATES PATENTS

| | | | |
|---|---|---|---|
| 2,447,249 | 8/1948 | Hill | 62—63 |
| 2,453,130 | 11/1948 | Hoffman | 99—193 |
| 2,974,497 | 3/1961 | Carpenter et al. | 99—193 X |
| 3,114,248 | 12/1963 | Morrison | 62—64 |
| 3,115,756 | 12/1963 | Overbye | 62—380 X |
| 3,214,928 | 11/1965 | Oberdorfer | 62—64 X |
| 3,277,657 | 10/1966 | Harper et al. | 62—64 X |
| 3,287,932 | 11/1966 | Schlemmer | 62—65 X |
| 3,297,454 | 1/1967 | Webster et al. | 99—193 |

EDWARD J. MICHAEL, *Primary Examiner.*

ROBERT A. O'LEARY, *Examiner.*

W. E. WAYNER, *Assistant Examiner.*